(12) United States Patent
Westphal

(10) Patent No.: US 7,313,536 B2
(45) Date of Patent: Dec. 25, 2007

(54) SYSTEM AND METHOD FOR PROVIDING PRODUCT RECOMMENDATIONS

(75) Inventor: Geoffry A. Westphal, Park Ridge, IL (US)

(73) Assignee: W.W. Grainger Inc., Lake Forest, IL (US)

( * ) Notice: Subject to any disclaimer, the term of this patent is extended or adjusted under 35 U.S.C. 154(b) by 22 days.

(21) Appl. No.: 10/452,868

(22) Filed: Jun. 2, 2003

(65) Prior Publication Data

US 2005/0171855 A1    Aug. 4, 2005

(51) Int. Cl.
    *G06Q 30/00* (2006.01)
(52) U.S. Cl. .................................. 705/26; 705/37
(58) Field of Classification Search ................ 705/26
    See application file for complete search history.

(56) References Cited

U.S. PATENT DOCUMENTS

| | | | |
|---|---|---|---|
| 4,996,642 A | 2/1991 | Hey | |
| 5,583,763 A | 12/1996 | Atcheson et al. | |
| 5,749,081 A | 5/1998 | Whiteis | |
| 6,041,311 A | 3/2000 | Chislenko et al. | |
| 6,049,777 A | 4/2000 | Sheena et al. | |
| 6,064,980 A | 5/2000 | Jacobi et al. | |
| 6,092,049 A | 7/2000 | Chislenko et al. | |
| 6,266,649 B1 * | 7/2001 | Linden et al. ................. | 705/26 |
| 6,304,854 B1 | 10/2001 | Harris | |
| 6,317,722 B1 | 11/2001 | Jacobi et al. | |
| 6,321,221 B1 | 11/2001 | Bieganski | |
| 6,334,127 B1 | 12/2001 | Bieganski et al. | |
| 6,356,879 B2 | 3/2002 | Aggarwal et al. | |
| 6,412,012 B1 | 6/2002 | Bieganski et al. | |
| 6,438,579 B1 | 8/2002 | Hosken | |
| 6,490,587 B2 | 12/2002 | Easty et al. | |
| 7,016,892 B1 * | 3/2006 | Kokkonen et al. ............. | 707/3 |
| 2002/0156688 A1 * | 10/2002 | Horn et al. .................... | 705/26 |
| 2003/0132298 A1 * | 7/2003 | Swartz et al. .......... | 235/472.02 |
| 2005/0187819 A1 | 8/2005 | Johnson | |

FOREIGN PATENT DOCUMENTS

JP         2002063489        *   2/2002

OTHER PUBLICATIONS

Bubble Sort, wikipedia, last updated Aug. 12, 2007, downloaded from http://en.wikipedia.org/wiki/Bubble_sort on the Internet on Aug. 17, 2007, 4 pages.*
Donald Knuth, The Art of Computer Programming, Sorting and Searching, 1973, pp. 396-399, vol. 3, Addison-Wesley Publishing Company, Inc.

* cited by examiner

*Primary Examiner*—James Zurita
(74) *Attorney, Agent, or Firm*—Greenberg Traurig LLP

(57) ABSTRACT

A dynamic merchandising system for presenting product recommendations to customers. The system and method generally creates for each of a plurality of products in a plurality of purchase orders a list of purchased-with products, i.e., products that were purchased with each of the plurality of products in each of the plurality of purchase orders. At the same time that the purchased-with product lists are created, or in another step, the same plurality of purchase orders are examined and, using the concept of "self organizing lists," the lists of purchased-with products are ordered in a meaningful manner. The ordering of the products in a purchased-with list may then be considered when recommending products.

4 Claims, 5 Drawing Sheets

Purchased-With Data Structure with Purchased-With String Populated AFTER processing PO 3298553

| Product Reference Number | Purchased-With String of Product Reference Numbers |
|---|---|
| 1F018 | |
| 2A225 | |
| 2V620 | |
| 3U552 | 4RJ34 6VR65 4L582 4L581 |
| 4L581 | 3U552 4RJ34 4L582 |
| 4L582 | 3U552 4RJ34 4L581 |
| 4RJ34 | 3U552    4L582 4L581 |
| 5T943 | |
| 6VR65 | 3U552 |
| ... | ... |

Purchase Order Collection

| Purchase Order Number Field | Product Reference Number |
|---|---|
| 3429993 | 1F018 |
| 3306540 | 3U552 |
| 3306540 | 6VR65 |
| 3526000 | 5T943 |
| 3605011 | 2A225 |
| 3244073 | 2V620 |
| 3197461 | 4RJ34 |
| 3227811 | 3U552 |
| 3227811 | 4RJ34 |
| 3227811 | 4L582 |
| 3227811 | 4L581 |
| 3298553 | 4RJ34 |
| 3298553 | 3U552 |
| ... | ... |

FIG. 1

Purchased-With Data Structure

| Product Reference Number | Purchased-With String of Product Reference Numbers |
|---|---|
| | |

FIG. 2

Purchased-With Data Structure with Unique Product Reference Numbers Populated

| Product Reference Number | Purchased-With String of Product Reference Numbers |
|---|---|
| 1F018 | |
| 2A225 | |
| 2V620 | |
| 3U552 | |
| 4L581 | |
| 4L582 | |
| 4RJ34 | |
| 5T943 | |
| 6VR65 | |

FIG. 3

Purchased-With Data Structure with Purchased-With String Populated BEFORE processing PO 3298553

| Product Reference Number | Purchased-With String of Product Reference Numbers |
|---|---|
| 1F018 | |
| 2A225 | |
| 2V620 | |
| 3U552 | 6VR65 4RJ34 4L582 4L581 |
| 4L581 | 3U552 4RJ34 4L582 |
| 4L582 | 3U552 4RJ34 4L581 |
| 4RJ34 | 3U552 4L582 4L581 |
| 5T943 | |
| 6VR65 | 3U552 |
| ... | ... |

FIG. 4

Purchased-With Data Structure with Purchased-With String Populated AFTER processing PO 3298553

| Product Reference Number | Purchased-With String of Product Reference Numbers |
|---|---|
| 1F018 | |
| 2A225 | |
| 2V620 | |
| 3U552 | 4RJ34 6VR65 4L582 4L581 |
| 4L581 | 3U552 4RJ34 4L582 |
| 4L582 | 3U552 4RJ34 4L581 |
| 4RJ34 | 3U552     4L582 4L581 |
| 5T943 | |
| 6VR65 | 3U552 |
| ... | ... |

FIG. 5

SYSTEM AND METHOD FOR PROVIDING PRODUCT RECOMMENDATIONS

BACKGROUND

This following generally relates to dynamic merchandising and, more particularly, relates to a system and method for providing product recommendations.

There are an increasing number of business to customer ("B2C") websites that allow customers to purchase products online. In using these systems, and at various times during the purchasing process, the website may offer recommendations of other products that the customer may also be interested in purchasing. These recommendations can serve not only to increase sales, but also to drive awareness that the merchant carries a particular product or brand.

By way of example, U.S. Pat. No. 6,317,722 discloses a system for recommending products to customers based upon the collective interests of a community of customers. For providing recommendations, a similar product table is created, using an off-line process, that functions to map a known product to a set of products that are identified as being similar to the known product. In this regard, similarity is measured by a weighted score value that is indicative of the number of customers that have an interest in two products relative to the number of customers that have an interest in either product. The numbers utilized to establish similarity in this manner are typically derived by examining invoices to determine when the two products appear together and when one product appears exclusive of the other product. The weighting value may be indicative of user ratings provided to products and/or a time duration since a product pair was last purchased.

In addition, many of the B2C websites sell products that are demographically sensitive. That is, it is assumed that any given product may appeal to customers only if the customer falls within a certain demographic category. These demographic categories might include an age range, an income range, a particular sex or sexual orientation, a particular marital status, a particular political view, a particular health status, etc. Thus, certain websites attempt to deduce demographic categories for customers based upon prior purchase histories of that customer and/or expressed product preferences provided by that customer. One such website is described in U.S. Pat. No. 6,064,980 which provides product recommendations by correlating product ratings provided by a customer with product ratings provided by other customers within a purchasing community.

While these website product recommendation techniques may be useful in the B2C environment, what is needed is an improved system and method for providing product recommendations, especially in the business to business ("B2B") environment where products may have less customer-demographic sensitivity and where products do not have fads, trends, and/or fashions.

SUMMARY

To address this need, the following describes a system and method for recommending products which utilizes product relationships that are considered independently of customer demographics. The system and method generally creates for each of a plurality of products in a plurality of purchase orders a list of purchased-with products, i.e., products that were purchased with each of the plurality of products in each of the plurality of purchase orders. At the same time that the purchased-with product lists are created, or in another step, the same plurality of purchase orders are examined and, using the concept of "self organizing lists," the lists of purchased-with products are ordered in a meaningful manner. The ordering of the products in a purchased-with list may then be considered when recommending products. The subject system and method may also be used to help identify significant customer behaviors that warrant additional processing or attention.

A better understanding of the objects, advantages, features, properties and relationships of the system and method for providing product recommendations will be obtained from the following detailed description and accompanying drawing that set forth illustrative embodiments that are indicative of the various ways in which the principles expressed hereinafter may be employed.

BRIEF DESCRIPTION OF THE DRAWINGS

For a better understanding of the system and method for providing product recommendations, reference may be had to preferred embodiments shown in the following drawings in which:

FIG. 1 illustrates an exemplary first data structure used to store data representative of information contained within a collection of purchase orders;

FIGS. 2-5 illustrate an exemplary second data structure used to order the data stored in the first data structure of FIG. 1;

DETAILED DESCRIPTION

Figure 6:
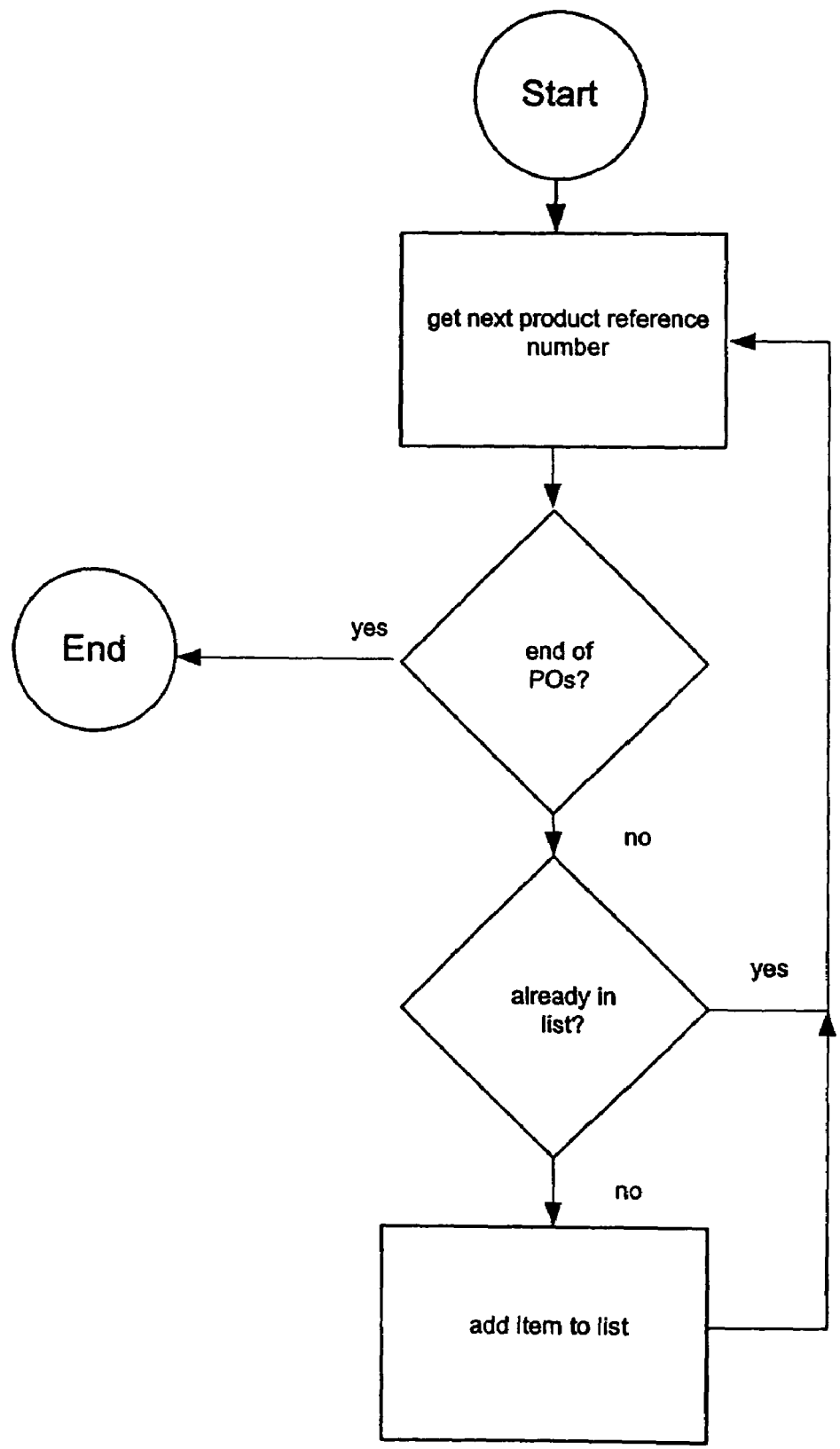
FIG. 6 illustrates a flow chart diagram of an exemplary method for populating the second data structure with data extracted from the first data structure.

With reference to the figures, a system and method for recommending products is hereinafter described. To this end, the system and method examines product relationships and utilizes a data structure in which information indicative of these product relationships is maintained. The product relationships reflected in the data structure may then be used to recommend products, either in a web-based system or, for example, to prepare product merchandizing literature.

To create a data structure useful in discerning product relationships, a collection of customer purchase orders is preferably assembled. This collection of purchase orders may be assembled from any source such as, but not limited to, purchase orders related to on-line purchases, phoned-in purchases, faxed-in purchases, and over-the-counter purchases. An assemblage of purchase order data stored in a first data structure is illustrated by way of example in FIG. 1. From this assemblage of purchase order data, product relationships may be determined by examining two data fields. The first data field 10 includes data 11 representative of a unique number assigned to each purchase order. The data 11 representative of the unique purchase order number allows the subject system and method to identify what products are contained in each purchase order. The second data field 12 includes data 13*a* representative of the reference numbers that have been assigned to products contained in each purchase order. The unique product reference numbers may be assigned by the vendor of the products, may be representative of a barcode label associated with the product, etc. Thus, in the example illustrated in FIG. 1, it can be discerned that a customer purchased products "3U552,"

"4RJ34," "4L582," and "4L581" in purchase order "3227811." It may also be seen in the exemplary assemblage of data illustrated in FIG. 1 that each unique product that is on every purchase order has a corresponding record which includes the first data field 10 (containing data 11 representative of the purchase order number) and the second data field 12 (containing data 13a representative of the product identifier for that product). It may be further seen that, when a product ("3U522") is repeated in the second data field 12, the data in the first data field 10 will be different, i.e., signifying that the same unique product was purchased in two different purchase orders. As further illustrated by the exemplary assemblage of data presented in FIG. 1, the assemblage of data need not track the number of times a given product was purchased in a given purchase order.

To populate a purchased-with data structure that may then be used to discern product relationships, the assemblage of purchase order data is further processed. In this regard, the assemblage of purchase order data is processed to populate two data fields in the purchased-with data structure. While not required, processing of the assemblage of purchase order data may be facilitated by sorting the assemblage of purchase order data by the purchase order number data field 10.

More particularly, as illustrated by way of example in FIGS. 2-4, the first data field 14 of the purchased-with data structure will include data 13b representative of a product reference number. The second data field 16 will include data 13c representative of products purchased-with the product referenced in the first data field 14—considering all of the purchase orders. The data 13c may be stored as a purchased-with string. When creating the purchased-with data structure, it will be appreciated that the second data field 16 should be large enough to hold data representative of all of the unique product references that could be purchased from the vendor with the product indicated in the first data field 14. It will also be appreciated that the purchased-with data structure should have enough records for each uniquely identifiable product. Thus, if a vendor sells 10,000 unique products, the purchased-with data structure will require no more than 10,000 records.

As particularly illustrated in FIG. 6, the purchased-with data structure may be populated by examining the assemblage of purchase order data to first discern the list of unique product references that occur within the purchase order collection. The unique product references that occur within the purchase order collection are then used to populate the first data field 14 of the purchased-with data structure. For this purpose, the data 13a representative of a product reference number in each record in the assemblage of purchase order data is examined to see whether that product reference number is reflected in the data 13b that already exists in a first data field 14 of the purchased-with data structure. If the product reference number 13b is already reflected in a first data field 14 of the purchased-with data structure, the record currently being examined may be skipped, i.e., a first data field 14 of the purchased-with data structure need not be populated with data representative of that product reference number. If, however, that product reference number is not reflected in a first data field 14 of the purchased-with data structure, a new record is added to the purchased-with data structure and the first data field 14 of that new record is populated with data 13b representative of that product reference number. This process may continue until all the records in the assemblage of purchase order data are examined in this way. In this manner, when this processing terminates, the purchased-with data structure will contain a single record for each unique product reference number that appears in the purchase order data assemblage as seen by way of example in FIG. 3. (Note that only one record appears that includes data 13b representative of product "3U552").

Figure 7:
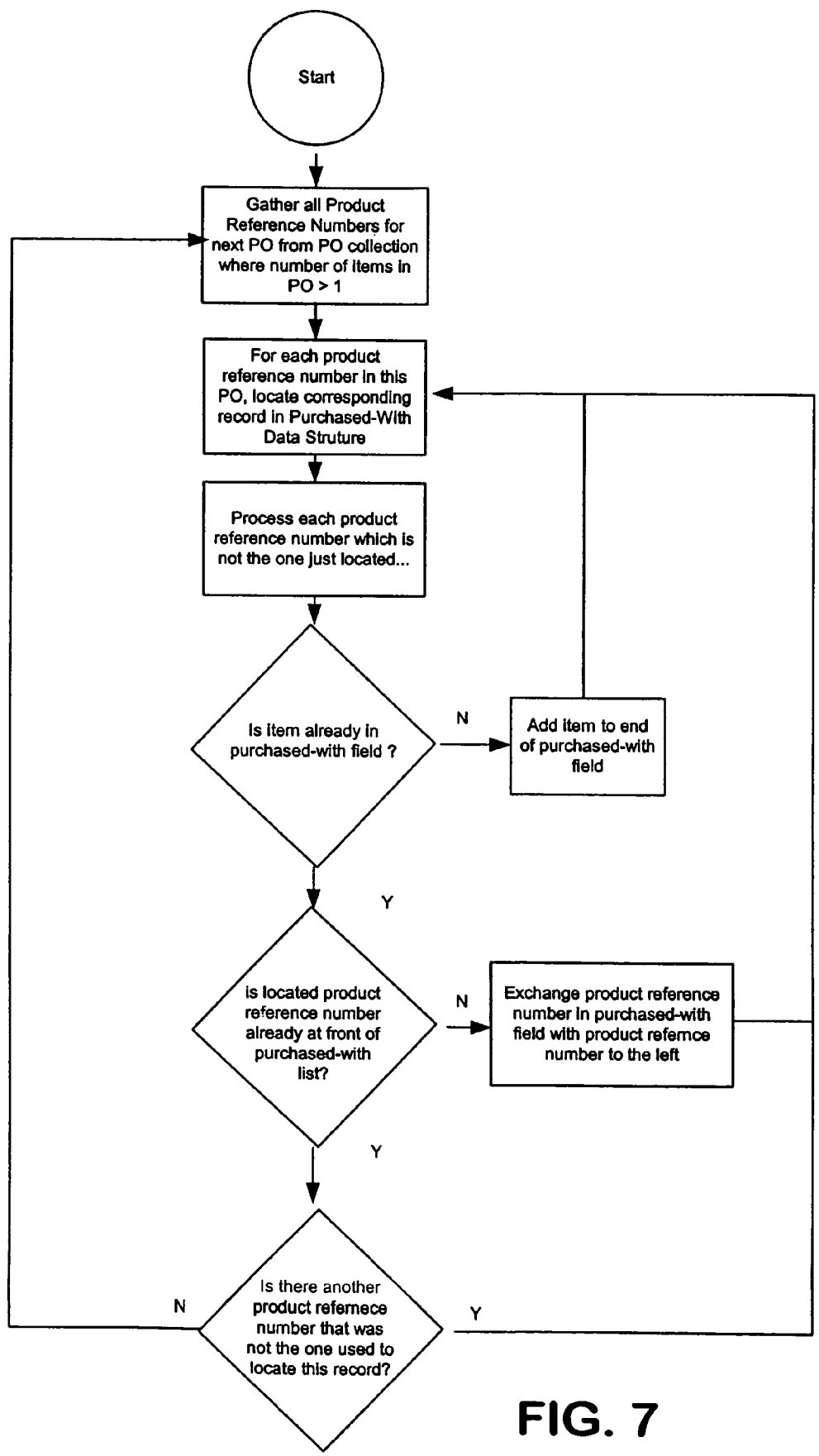
FIG. 7 illustrates a flow chart diagram of an exemplary method for populating and ordering the data within the second data structure.

To then populate and order the data 13c in the second data field 16 of the purchased-with data structure, all the records in the assemblage of purchase order history data are again examined this time examining product groupings that correspond to a purchase order number. As illustrated in FIG. 7, the process may start with the first record in the purchase order history data assemblage and, using the purchase order number reflected by the data 11 in the record currently being examined, all the unique product reference numbers as reflected in the second data field 12 for a record having data 11 representative of that current purchase order number are collected. Then, for each product reference number in this collection, a corresponding record in the purchased-with data structure is located, i.e., a record having data 13b in the first data field 14 which corresponds to one of the product reference numbers in the collection. Once each record in the purchased-with data structure is located, the data 13c in the second data field 16 of each record is examined to determine whether each of the remaining product reference numbers in the collected data (i.e., each product in the collected data but the product referenced by the first data field 14 of that record) is reflected within the data 13c. If the data 13c reflects a product reference number from the product reference numbers in the collected data currently being considered, then the data representative of that product reference number may be exchanged with adjacent data, if any, within the second data field 16, e.g., the product reference number immediately to its left. If the product reference number currently being considered is not reflected by the data 13c present in the second data field 16, then data reflective of that product reference number may be added to the second data field 16, e.g., to the end of the purchased-with string in the purchased-with data structure. Each collection of product reference numbers is processed in this way.

This manner of processing the data is illustrated in FIGS. 4 and 5. In this illustrated example, it will be seen that, when purchase order "3298553" is processed, product "4RJ34"—which was purchased with product "3U552"—is exchanged in location with the adjacent product "6VR65" in the record having data 13b in data field 14 that is representative of product "3U552." Similarly, since product "3U552" has already been placed into data field 16 of the record having data representative of product "4RJ34"—signifying that an earlier purchase order included these two products—and since product "3U552" is already at the front of the list, the data indicative of product "3U552" is left unchanged in location. As further illustrated in FIG. 5, in some instances it may be desirable to insert a "null" product place holder in the location immediately behind product "3U552" in this case where the purchased-with product under consideration is already located in the predetermined location in the list, e.g., the front of the list. The use of a "null" product place holder, which may be blank characters when the data 13c is stored in a string, assists in maintaining purchased-with products that have a high tendency of being purchased with the product indicated by the data 13b in data field 14 in the vicinity of the predetermined location in cases when the purchased-with occurrences are not evenly distributed within the data set being consider. When place holder are utilized, they may be treated as product data during the process of exchanging locations within the second data field 16.

It is to be understood that ordering the data in the second data field 16 in such a manner may be performed concurrently with the populating of the second data field 16 or at a later time. It is to be further understood that the steps of ordering the data in the second data field 16 may be performed over multiple iterations to further ensure that products that are purchased concurrently with the product represented in the first data field 14 of a record are moved towards a predetermined location within the second data field 16. In this case, the number of iterations may be a number selected so as to generally assure that the ordering attains some degree of stability each time the process is repeated or the ordering itself can be examined after each pass to determine if the ordering has attained a desired level of stability after which time the repetitions of the process may be halted.

From the foregoing, it will be understood that, after all the purchase order product collections are processed in this manner, the purchased-with data structure will have 'n' records that correspond to 'n' unique items that are contained in the aggregation of purchase order data and each purchased-with field 16 in the purchased-with data structure will contain a list of unique products reference numbers that were purchased with the product reference number in the first field 14 of that record. If a product referenced in the first field 14 of the purchased-with data structure was not purchased with another product, the second data field 16 for the record for that product will be empty. It will also be understood that the method for ordering the data in the second data field 16 functions to move the products that are generally the most frequently purchased with each product referenced by the data in the first field 14 towards a predetermined location within the second data field 16, e.g., towards the front of the purchased-with string. This general ordering of the data in the second data field 16 will be sufficient to allow a B2B (or B2C) vendor to merchandise numerous products a customer may be interested in purchasing without requiring the vendor to consider the exact ranking or frequency of each of the purchased-with events. It will also allow marketing of products without requiring customer product rankings.

In particular, for identifying those products that may be of interest to a customer, the system and method considers the location of the product data within the second data field 16. For example, when a customer identifies a product as being of interest, the first data field 14 of the purchased-with data structure may be examined to find the record corresponding to that product. The second data field 16 of that record can then be examined to extract the data in the second data field 16 that is located within the predetermined location within the second data field 16. The products recommended would preferably be the products represented by the data in the predetermined location, i.e., this data would be representative of the products likely to be most often purchased with the identified product. While not intended to be limiting, the predetermined location may be the front of the purchased-with data string or the first X data entries in the front of the purchased-with data string.

The recommended products can be displayed to the customer in writing or images or be verbally expressed to the customer. Product recommendations may also include other data associated with the products recommended such as descriptions, prices, images, etc. It is to be understood that product identification used in the recommendation process may be by the customer searching for products using a website search engine, by being placed into a shopping cart, by being mentioned by customers in a conversation over the phone or in person, etc. Still further, the purchased-with data structure may be examined to discern products that are likely to be purchased together for the purpose of associating those products within a catalog or other sales literature, for providing directed marketing mailings, etc. The purchased-with data structure utilized in the recommendation process may be made accessible by being located on one or more servers within a network, may be distributed by being placed onto a CD or DVD ROM, may be downloadable, etc. In this manner, the purchased-with data structure may be accessible by being directly readable by a hand-held device (such as a PDA) or, for example, by providing the hand-held device with network access, preferably wireless, whereby the PDA may access the network server(s) on which the purchased-with data structure is stored.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A computer-readable media having computer-executable instructions for use in providing a product recommendation, the instructions performing steps comprising:
   (a) using data obtained from a plurality of purchase orders to: i) create a list of purchased-with products wherein each product within the list of purchased-with products was purchased-with a uniquely identified product; and ii) affect positioning of each product within the list of purchased-with products relative to remaining products within the list of purchased-with products each time data representative of that product occurs during at least one simultaneous examination of an assemblage of the data obtained from the plurality of purchased orders such that a position of a product within the list of purchased-with products resulting upon conclusion of the at least one examination indicates, relative to the remaining products with the list of purchased-with products, a frequency with which the product was purchased-with the uniquely identified product;
   (b) in response to a selection which indicates that the uniquely identified product is of interest to a consumer, causing at least one product from the list of purchased-with products to be selected as a function of its resulting position within the list of purchased-with products relative to remaining products within the list of purchased-with products; and
   (c) providing the selected at least one product to the consumer as the product recommendation.

2. The computer-readable media as recited in claim 1, wherein the list of purchased-with products comprises an array of string data.

3. The computer-readable media as recited in claim 1, wherein the data obtained from the plurality of purchased orders comprises a plurality of data records each having a first data field having data representative of a purchase order number and a second data field having data representative of one product with the purchase order referenced by the purchase order number in the first data field such that no record has the same data in both the first data field and second data field.

4. The computer-readable media as recited in claim 1, wherein a plurality of uniquely identified products are contained within the plurality of purchase orders and wherein step (a) is repeated for each of the plurality of uniquely identified products to thereby created a plurality of lists of purchased-with products, each of the plurality of lists of purchased-with products being associated with one of the plurality of uniquely identified products and wherein, in response to a selection which indicates that one of the plurality of uniquely identified products is of interest to the consumer, causing at least one product from the list of purchased-with products that is associated with the selected one of the plurality of uniquely identified products to be selected as a function of its resulting position within the list of purchased-with products that is associated with the selected one of the plurality of uniquely identified products relative to remaining products within the list of purchased-with products that is associated with the selected one of the plurality of uniquely identified products and providing the selected at least one product from the list of purchased-with products that is associated with the selected one of the plurality of uniquely identified products to the consumer as the product recommendation.

* * * * *